No. 692,356. Patented Feb. 4, 1902.
J. B. ROBIN.
CARVING MACHINE.
(Application filed June 17, 1901.)
(No Model.) 6 Sheets—Sheet 1.

Witnesses,
William H. Palmer.
Emily Eastman.

Inventor,
Jean B. Robin.
by Lothrop & Johnson
his Attorneys.

No. 692,356. Patented Feb. 4, 1902.
J. B. ROBIN.
CARVING MACHINE.
(Application filed June 17, 1901.)
(No Model.) 6 Sheets—Sheet 2.

Witnesses,
William H. Palmer.
Emily Eastman.

Inventor,
Jean B. Robin,
by Lothrop & Johnson
his Attorneys.

THE NORRIS PETERS CO., PHOTO-LITHO., WASHINGTON, D. C.

No. 692,356. Patented Feb. 4, 1902.
J. B. ROBIN.
CARVING MACHINE.
(Application filed June 17, 1901.)
(No Model.) 6 Sheets—Sheet 3.

Witnesses,
William H. Palmer.
Emily Eastman

Inventor
Jean B. Robin.
by Lothrop & Johnson
his Attorneys.

THE NORRIS PETERS CO., PHOTO-LITHO., WASHINGTON, D. C.

No. 692,356. Patented Feb. 4, 1902.
J. B. ROBIN.
CARVING MACHINE.
(Application filed June 17, 1901.)
(No Model.) 6 Sheets—Sheet 4.

Witnesses,
William H. Palmer
Emily Eastman

Inventor,
Jean B. Robin.
by Lothrop & Johnson
his Attorneys.

No. 692,356. Patented Feb. 4, 1902.
J. B. ROBIN.
CARVING MACHINE.
(Application filed June 17, 1901.)
(No Model.) 6 Sheets—Sheet 5.

Witnesses,
William H. Palmer,
Emily Eastman

Inventor,
Jean B. Robin.
by Lothrop & Johnson
his Attorneys.

THE NORRIS PETERS CO., PHOTO-LITHO., WASHINGTON, D. C.

No. 692,356. Patented Feb. 4, 1902.
J. B. ROBIN.
CARVING MACHINE.
(Application filed June 17, 1901.)
(No Model.) 6 Sheets—Sheet 6.

Witnesses,
William H. Palmer.
Emily Eastman

Inventor,
Jean B. Robin.
by Lothrop & Johnson
his Attorneys.

THE NORRIS PETERS CO., PHOTO-LITHO., WASHINGTON, D. C.

UNITED STATES PATENT OFFICE.

JEAN B. ROBIN, OF ST. PAUL, MINNESOTA.

CARVING-MACHINE.

SPECIFICATION forming part of Letters Patent No. 692,356, dated February 4, 1902.

Application filed June 17, 1901. Serial No. 64,838. (No model.)

*To all whom it may concern:*

Be it known that I, JEAN B. ROBIN, a citizen of France, residing at St. Paul, in the county of Ramsey and State of Minnesota, (whose post-office address is 66 West Indiana avenue,) have invented certain new and useful Improvements in Carving-Machines, of which the following is a specification.

My invention relates to improvements in woodworking-machines, its object being particularly to provide a machine for cutting ornamental patterns in wood, and particularly in the strips and corners of door and window casings.

To this end my invention consists in the features of construction and combination hereinafter particularly described and claimed.

Figure 1:
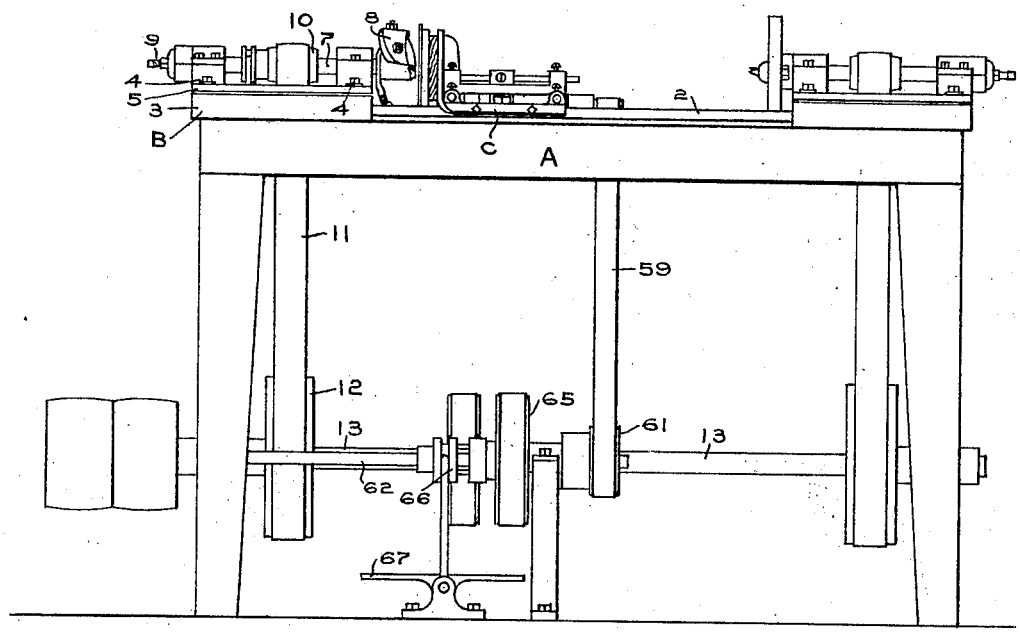
Figure 2:
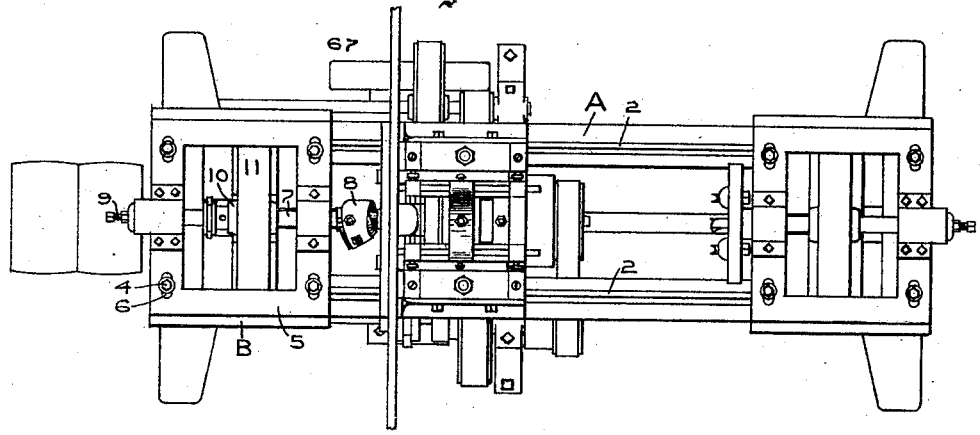
Figure 3:
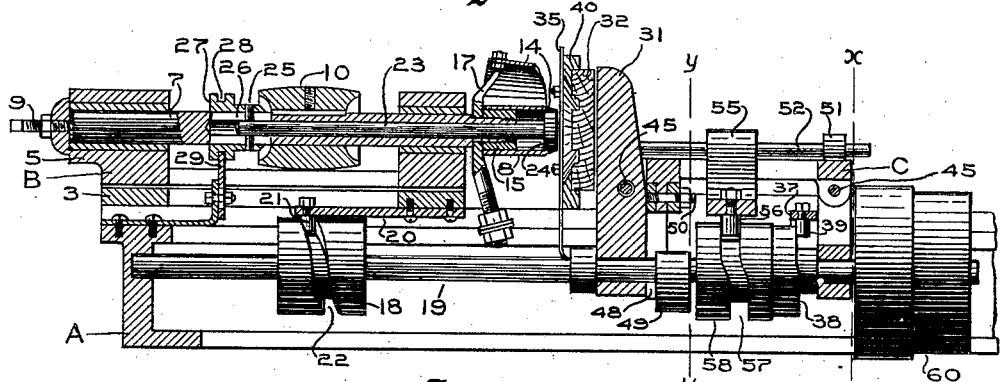
Figure 4:
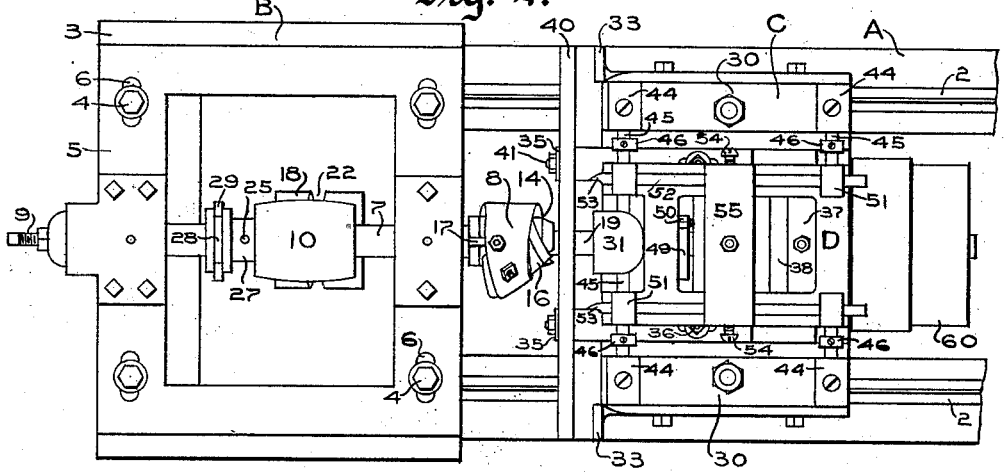
Figure 5:
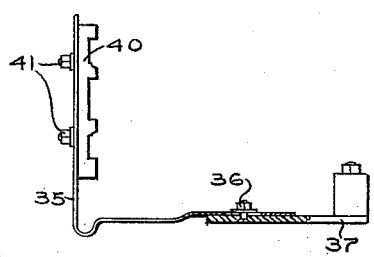
Figure 6:
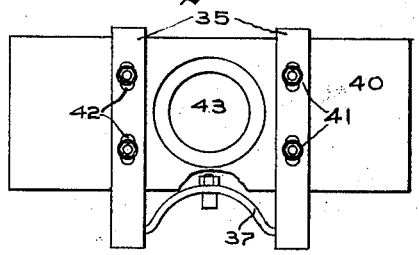
Figure 7:
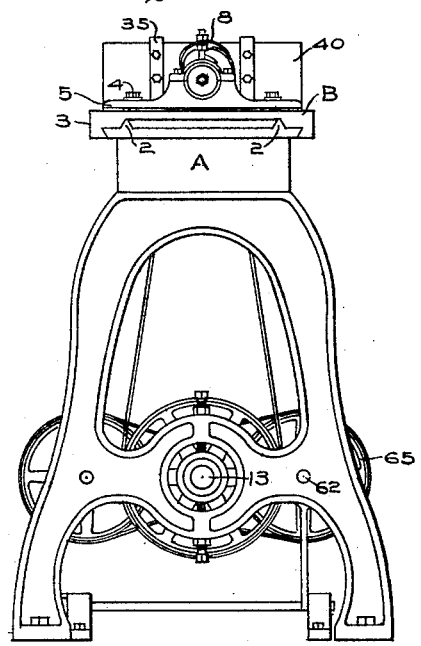
Figure 8:
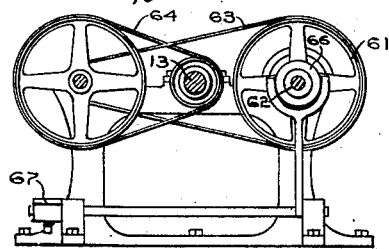
Figure 9:
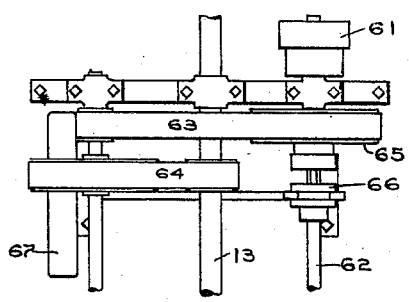
Figure 10:
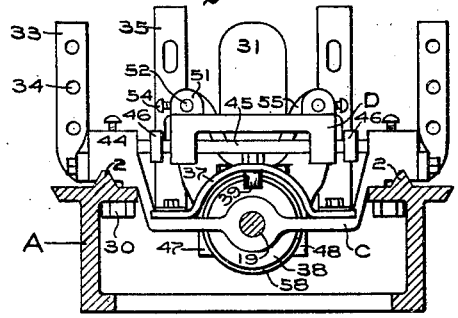
Figure 11:
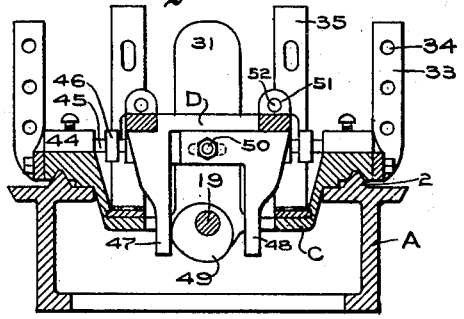
Figure 12:
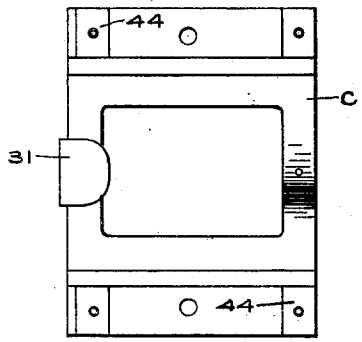
Figure 13:
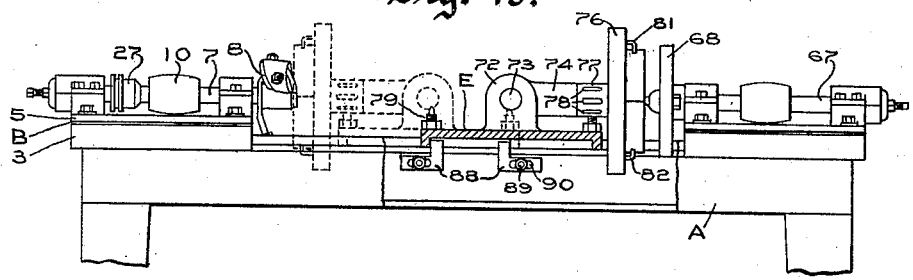
Figure 14:
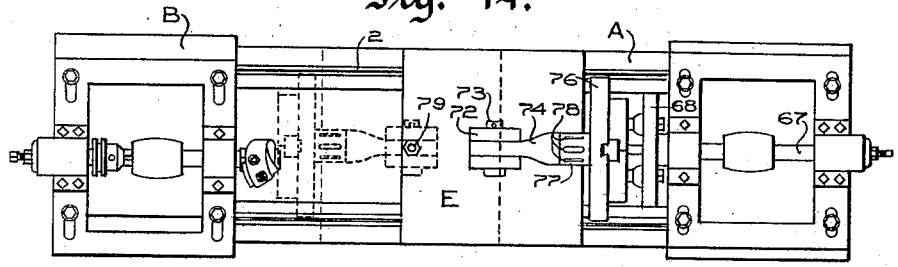
Figure 15:
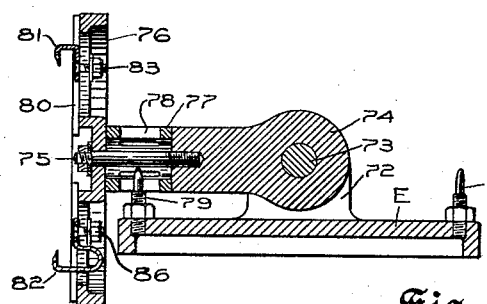
Figure 16:
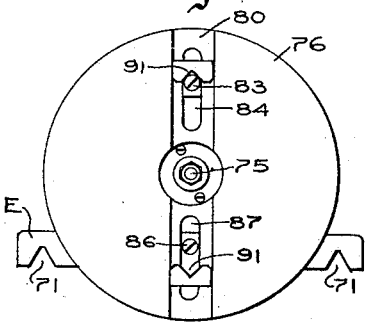
Figure 17:
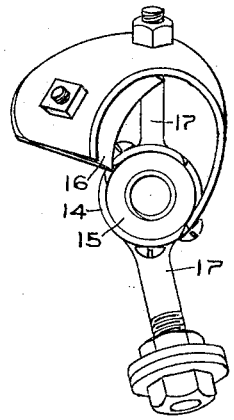
Figure 18:
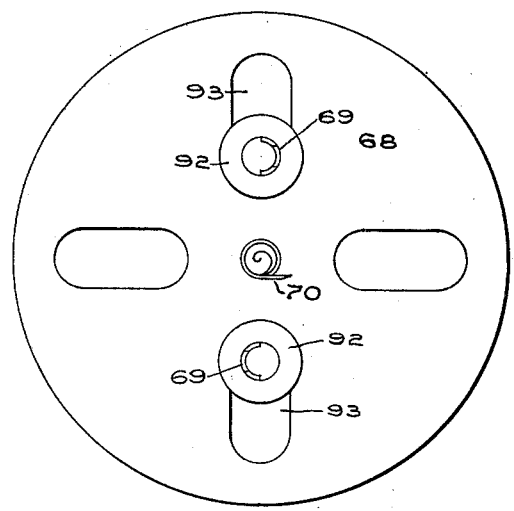
Figure 19:
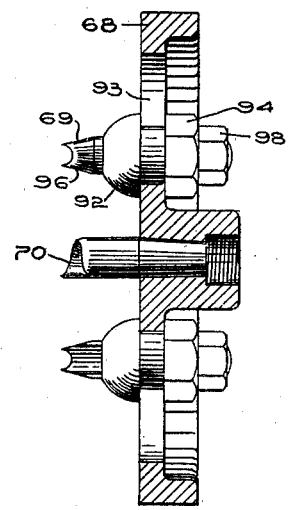
Figure 20:
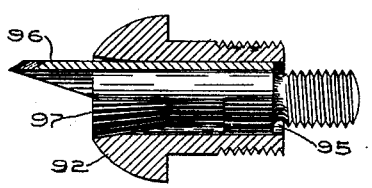
Figure 21:
Figure 22:
Figure 23:
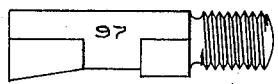
Figure 24:
Figure 25:
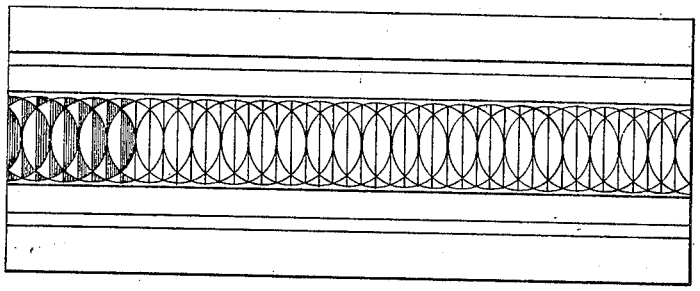
Figure 26:
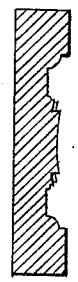
Figure 27:
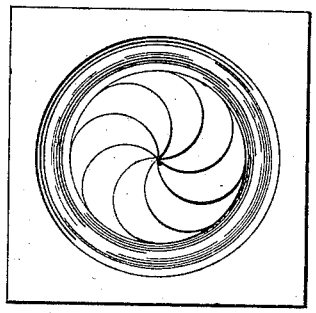
Figure 28:
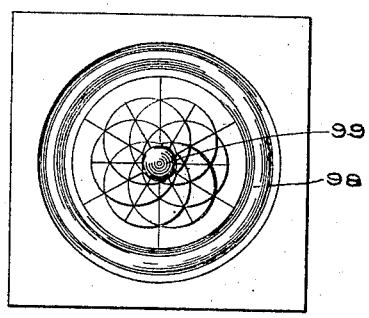
Figure 29:
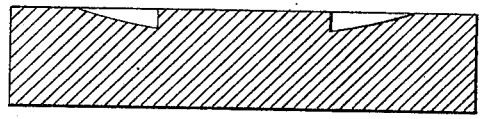

In the accompanying drawings, forming part of this specification, Figure 1 is a rear elevation of my improved machine. Fig. 2 is a plan view. Fig. 3 is a longitudinal vertical section of the upper portion of my machine. Fig. 4 is an enlarged plan of one end of the machine, the lower framework not being shown. Figs. 5 and 6 are details of a clamping-slide forming part of my machine. Fig. 7 is an end elevation of my improved machine. Figs. 8 and 9 are details of part of the driving-gear. Fig. 10 is an end view of the feed mechanism shown on line $x\,x$ of Fig. 3. Fig. 11 is a vertical cross-section of the same, taken on line $y\,y$ of Fig. 3. Fig. 12 is a plan view of the supporting-cradle for the feed mechanism. Fig. 13 is a rear elevation of the upper part of my machine shown arranged for cutting designs in corner-blocks. Fig. 14 is a plan view of the same. Fig. 15 is a longitudinal section of a block-holding device forming part of my machine. Fig. 16 is a front elevation of said device. Fig. 17 is a detail of a cutter forming part of my machine. Fig. 18 is a front view of a knife-supporting plate used in the block-cutting machine. Fig. 19 is a cross-section of the same. Fig. 20 is a longitudinal section of cutters carried by said plate. Figs. 21 to 24 are details of one of the cutters carried by said plate. Fig. 25 is a plan view of a strip after it has been acted upon by my machine. Fig. 26 is a cross-section of the same. Figs. 27 and 28 are details of corner-blocks, showing general character of designs; and Fig. 29 is a section of a block in which one cut has been made by the cutter shown in Fig. 17.

In the drawings, A represents the frame of the machine, provided upon its top with longitudinal guides or rails 2. Slidably supported upon the rails at one end of the machine is a carriage B, which forms a support for the main cutter. This carriage consists of the bed-plate 3, slidable upon the rails 2. Secured upon the top of the bed-plate 3 by means of bolts 4 is the frame 5. The bolts 4 pass through transverse slots 6 in the upper frame of the carriage, so as to provide for its lateral adjustment. Having journal-support in the upper frame of the carriage is the shaft 7, carrying upon one end the cutter 8. The opposite end of the shaft bears against a screw 9, threaded through the end of the carriage. By means of this screw the shaft may be longitudinally adjusted. Secured upon the shaft is a pulley 10, connected by a belt 11 with a pulley 12, mounted upon the main driving-shaft 13. The cutter 8 consists of a blade 14, secured upon the head 15, which is secured upon the end of the shaft 7. As shown in the drawings, the blade 14 surrounds a circular head 15, forming a circular cutter slightly larger than the head. One end of the blade 14 is carried outward and has secured to its outer end a second knife 16 to complete the design. Arranged against the rear of the cutter-head is an arm 17, one end of the arm being connected with the end of the blade 14 and the opposite end being weighted, as shown, to keep the cutter balanced. The carriage B is caused to travel upon the rails 2 by means of the grooved cam 18, secured upon the counter-shaft 19, which is journaled in the upper portion of the frame A. The arm 20, secured to the under side of the carriage, carries upon its free end a downwardly-projecting roller 21, which projects into the groove 22 of the cam 18. In order to force the cuttings out of the center portion of the knife 14 after a cut has been made, I make the end of the shaft 7 hollow and slidably arrange therein a rod 23, carrying upon its outer end a plunger 24, standing within the central portion of the cutter-blade 14. The opposite end of the rod 23 is provided with a cross-pin 25, projecting through slots 26 in the sides of the shaft 7. The ends of the cross-pin 25 project into a collar 27, surrounding the shaft 7 and adapted to rotate therewith. The collar 27 is formed with a circumferential groove 28, into which projects the end of an arm 29, which is secured to the end of the machine-frame A, as shown in Fig. 3. The arm 29 prevents longitudinal movement of the collar 27, while allowing it to rotate freely with the shaft 7. Thus as the shaft 7 is moved longitudinally in the travel of the carriage it slides in the collar 27, causing relative movement between the plunger 24 and the end of the cutter-blade 14.

In order to hold the piece of material being worked upon the front of the cutter 8 and to carry said piece through the machine, I provide the following-described parts.

C represents a cradle secured to the rails in front of the cutter 8 by means of bolts 30. The cradle is formed at its forward end with the central upwardly-projecting supporting-arm 31, which forms the back plate for the material 32, as shown in Fig. 3. Secured to the sides of the cradle C and projecting upwardly in line with the support 31 are the arms 33. These arms are formed with openings 34 to allow the attachment of strips to provide for curved strips of material or to guide straight pieces through at any angle.

In order to hold the material, which in the drawings is a strip of grooved molding designed for a casing, against the supports 31 and 33, I provide the device shown in Figs. 5 and 6. This device consists of the arms 35, preferably of spring material, each of said arms being slidably connected by a bolt 36 to the yoke 37. The bolt 36 passes through a slot in the arm 35. The yoke 37 rests in the bottom of the cradle C, and its rear end passes over the cam 38, as shown in Fig. 10, and is provided with a downwardly-projecting roller 39, which bears against the face of the cam 38 to cause the yoke, with the arms 36, to be horizontally reciprocated. To the inner sides of the upwardly-projecting portions of the arms 35 is secured the block 40 by means of bolts 41. In order to provide for the vertical adjustment of the block, the bolts 41 pass through slots 42 in the arms 35. The face of the block 40 is formed to fit the contour of the material 32, so as to hold the same supported. The block 40 is formed with an opening 43, through which the cutter works.

In order to feed the material through the machine, I provide the following-described parts: Secured in the lugs 44 upon the corners of the cradle C are the transverse shafts 45, and slidable upon these shafts is the carriage D, as shown best in Figs. 4 and 10, the movement of the carriage upon the shafts being limited by the adjustable stops 46. The forward end of the carriage D is provided with a pair of downwardly-projecting fingers 47 and 48, standing upon opposite sides of a cam 49, secured upon the shaft 19. The finger 47 is an integral part of the carriage, and the finger 48 is adjustably connected thereto by means of a bolt 50. Upon the four corners of the carriage D are the upwardly-projecting lugs 51, through which slidably pass the longitudinally-arranged rods 52, having their forward ends 53 pointed, as shown. Secured to the rods 52 intermediate of the lugs 51 by means of the screws 54 is the yoke 55. The center of said yoke extends downwardly, as shown in Figs. 3 and 10, and carries a roller 56, extending into the groove 57 of the cam 58, mounted upon the shaft 19. By means of the just-described parts the material will be fed through the machine, as hereinafter described.

The shaft 19 is operated by a belt 59, running over a pulley 60 upon the shaft 19 and a pulley 61 upon the counter-shaft 62. The counter-shaft 62 is connected with the main driving-shaft 13 by belts 63 and 64. The pulley 65, supporting one end of the belt 63, is forced into connection with the pulley 61 by the clutch 66, actuated by the lever 67. Upon the opposite end of the machine is journaled the shaft 67, carrying the plate 68, upon the face of which are secured the pair of knives 69 and the central knife 70. This part of the machine is adapted to be used in the making of the corner-blocks shown in Figs. 27 and 28.

As shown in Figs. 1 to 4, inclusive, the machine is fitted up for the making of the strip shown in Fig. 25. In this operation the strip 32 is normally held by the clamping of the arms 35 against the face of the plate 31. The turning of the shaft 19 carries the cutter forward by means of the cam 18 to cut one of the circles shown in the strip. As soon as this is cut the cam draws the cutter away from the material, and as the plunger stands stationary the cuttings will be forced from the center of the cutter and will drop to the floor. As the knife is carried away from the material the cam 58 actuates the yoke 55 to carry the rods 52 forward into the material. As this takes place the cam 38 is freed from the roller 39 to free the clamping device from the material. As the ends of the rods 52 sink into the work they carry the same slightly away from the support 31, and the continued rotation of the shaft 19 actuates the cam 49 against the finger 47 to move the carriage D, thus moving the rods laterally to carry the material a predetermined distance through the machine. The continued rotation of the shafts then actuates the cams to withdraw the rods from the material, to slide the carriage D back to normal position, and to actuate the clamping-arms 35 to again carry the material against the support 31, in position for a second operation of the cutter.

In Figs. 13 and 14 the machine is shown fitted up to cut designs upon corner-blocks, as illustrated in Figs. 27 and 28. In order to adapt the machine for this purpose, I remove the cradle C and supported parts, the shaft 19, and the means for sliding the main cutter. I then place upon the rails 2, intermediate of the cutter 8 and the plate 68, the carriage E, formed with grooves 71 to receive the rails. In the upwardly-projecting post 72 upon the carriage E is supported, by means of the pivot 73, the arm 74, to the outer end of which is secured, by means of the bolt 75, the plate 76. Intermediate of the plate and arm is arranged the sleeve 77, provided with a series of slots 78, into one of which slots is adapted to project one of the posts 79, projecting upwardly from the opposite ends of the carriage E. Slidable in a groove 80 in the face of the plate 76 are the clamps 81 and 82. The clamp 81 is secured in adjusted position upon the plate by means of a bolt 83, projecting into a slot 84 in the plate. The clamp 82 is turned upon itself to form a spring, as shown in Fig. 15, and is secured in adjusted position to the plate by means of a bolt 86, passing through the slot 87 in the plate. In order to limit the movement of the carriage E, I provide stops 88, secured to the side of the machine-frame, said stops being each held in adjusted position by a bolt 89, passing through a slot 90 in the stop. In order to secure a block upon the face of the plate 76, the end of the spring-clamp 82 may be sprung outward by the block to bring said block within the clamps, when the spring of the clamp 82 will securely hold the block in place. Each of the clamps, as shown in Fig. 16, is formed with a notch 91 to receive a corner of the block. The clamps are adapted to be adjusted for blocks of different sizes.

In Figs. 20 to 24 are shown details of the cutter 69. This is made up of the block 92, projecting through an opening 93 in the plate 68 and held therein by the nut 94. The block 92 is provided with a central opening 95, in which is arranged the knife 96. Said knife is secured in position by means of the wedge-shaped plug 97, adapted to be tightened by a nut 98.

In operation the carriage E is moved by hand to bring the block of wood into contact with the cutter 8. This cutter will cut a circle in the wood, as illustrated in Fig. 29, by holding the arm 74 at different angles, and by laterally adjusting the part 5 of carriage B the circles can be differently positioned upon the block, as shown in Figs 27 and 28. As shown in Fig. 28, the circles overlap, the different circles being made by turning the plate 76 after each cut, so that the post 79 will rest in the next succeeding slot. A central raised portion is thus left. When the series of circles have been cut, the arms turn into the full-line position shown in Fig. 13 and the block is held against the cutters 69 and 70. The rotation of the plate 68 will cause the knife to cut the surrounding bead 98 and the central cutter to form the centrally-raised portion 99. By adjusting the part 5 of carriage B and by adjusting the height of the post 79 in order to hold the arm 73 at different angles and by using sleeves 77 with the different number of slots a great variety of designs can be made.

I claim—

1. In a machine of the class described, the combination with the supporting-framework, and a rotatable cutter carried thereby, of a material-support arranged in front of said cutter, a clamp normally holding a piece of material against said support, a carriage slidable toward and from said support, and slidable parallel to the face of said support, means carried by said carriage to engage with said material and carry the same a predetermined distance through the machine, and means for releasing the clamp from the material as the same is carried through the machine.

2. In a machine of the class described, the combination with the framework, and a rotatable cutter carried thereby, of a material-support arranged in front of said cutter, a clamp normally holding a piece of material against said support, a carriage slidable toward and from said support, and slidable parallel to the face thereof, means for actuating said clamp to release said material, and means carried by said carriage to engage with said material, as and for the purpose set forth.

3. In a machine of the class described, the combination with the supporting-framework, of a rotatable cutter slidably supported thereby, a carriage slidably supported in front of said cutter, means for holding the material against the face of said carriage when the cutter is carried toward the material, means for releasing the material when the cutter is carried away, and simultaneously moving the material a predetermined distance through the machine, and means for simultaneously forcing the cuttings from the cutter.

4. In a machine of the class described, the combination with the supporting-framework, of a rotary cutter carried thereby, a driving-shaft, a cradle supported in front of said cutter, clamping means for holding a piece of material against said cradle, a carriage transversely slidable in said cradle, pointed rods slidably supported in said carriage, and operating connections between said shaft and said clamping means, carriage and rods, as and for the purpose set forth.

5. In a machine of the class described, the combination with the supporting-framework, of a rotatable cutter carried thereby, a driving-shaft, a cradle supported in front of said cutter, a clamping device slidable longitudinally of said cradle for holding a piece of material against the face thereof, rods secured transversely of said cradle, a carriage slidable thereon, pointed rods slidably supported by said carriage, and means operated from said shaft for releasing said clamping means from said material and for actuating said carriage and pointed rods to carry said material a predetermined distance through the machine.

6. In a machine of the class described, the combination with the supporting-framework, of a rotary cutter carried thereby, a driving-shaft, a cradle supported in front of said cutter, a clamping device slidable longitudinally of said cradle for holding a piece of material against the face of said cradle, an operative connection between said clamping device and driving-shaft, rods secured transversely of said cradle, a carriage slidably supported upon said rods, downwardly-projecting fingers upon said carriage, a cam carried by said driving-shaft between said fingers, pointed rods slidably supported by said carriage, and an operating connection between said rods and driving-shaft.

In testimony whereof I affix my signature in presence of two witnesses.

JEAN B. ROBIN.

Witnesses:
    H. S. JOHNSON,
    EMILY EASTMAN.